US005773513A

United States Patent [19]

Huybrechts et al.

[11] Patent Number: 5,773,513
[45] Date of Patent: Jun. 30, 1998

[54] HYDROXY FUNCTIONAL ACRYLIC POLYMER PREPARED VIA SKEW FEED POLYMERIZATION

[75] Inventors: Jozef Huybrechts, Oud-Turnhout, Belgium; Kerstin Stranimaier, Hennef, Germany

[73] Assignee: E. I. du Pont de Nemours and Company, Wilmington, Del.

[21] Appl. No.: 627,529

[22] Filed: Apr. 4, 1996

[51] Int. Cl.$^6$ .................................................. C08K 5/05
[52] U.S. Cl. .................. 525/161; 523/402; 524/599; 524/761; 525/123; 525/124; 525/162
[58] Field of Search ................... 525/161, 162, 525/123, 124; 523/402; 524/599, 761

[56] References Cited

U.S. PATENT DOCUMENTS

| | | | |
|---|---|---|---|
| 4,818,796 | 4/1989 | Das et al. | 525/329.5 |
| 4,918,129 | 4/1990 | Probst et al. | 524/457 |
| 4,981,921 | 1/1991 | Blum et al. | 525/419 |
| 4,988,766 | 1/1991 | Das et al. | 525/123 |
| 5,015,688 | 5/1991 | Bederke et al. | 524/600 |
| 5,098,947 | 3/1992 | Metzger et al. | 524/507 |
| 5,266,361 | 11/1993 | Schwarte et al. | 427/401.1 |
| 5,275,847 | 1/1994 | Schwarte et al. | 427/407.1 |
| 5,539,022 | 7/1996 | Schmidt et al. | 523/402 |

FOREIGN PATENT DOCUMENTS

| | | |
|---|---|---|
| 218906 | 4/1987 | European Pat. Off. . |
| 0521926 | 1/1994 | European Pat. Off. . |
| 579193 | 1/1994 | European Pat. Off. . |

*Primary Examiner*—Fred Zitomer
*Attorney, Agent, or Firm*—Hilmar L. Fricke

[57] ABSTRACT

A waterborne coating composition comprising 5–70 weight percent solids of a curing agent and 30–95 weight percent solids of a hydroxy functional acrylic copolymer further comprising 20–70 weight percent of a vinyl aromatic, 0–40 weight percent of a hydroxy functional monomer, 0–70 weight percent of other polymerizable compounds, and 10–80 weight percent of a reaction product of a monoepoxyester and an unsaturated acid functional monomer wherein the copolymer is prepared via skew feed polymerization having a plurality of feed streams charged to a reactor and one feed stream contains 5–60 weight percent of the unsaturated acid functional monomer, 40–95 weight percent of the reaction product of a monoepoxyester and an unsaturated acid functional monomer, and 0–55 weight percent of the other polymerizable compounds.

11 Claims, No Drawings

HYDROXY FUNCTIONAL ACRYLIC POLYMER PREPARED VIA SKEW FEED POLYMERIZATION

BACKGROUND OF THE INVENTION

The hydroxy functional acrylic composition claimed herein is useful as a coating material having improved appearance, humidity resistance, and acid etch resistance, and in particular is useful as waterborne clearcoat in the automotive finishes industry for original equipment manufacture (OEM) applications.

Coating compositions generally comprise a carrier liquid, a film forming polymer, a curing (crosslinking) agent, and various additives such as pigments, U.V. stabilizers, dispersion agents, etc. For waterborne coatings, the carrier liquid is primarily water. The combination of the film forming polymer and the crosslinking agent is commonly referred to as a binder. In general, it is desirable that the binder have a low viscosity such that the binder is readily sprayable using automated spaying equipment and a high solids content such that an adequate paint film thickness is yielded with one to two cross-passes of a spray gun.

U.S. Pat. No. 5,266,361 describes an acrylic copolymer dispersion for use as an OEM clearcoat, wherein the acrylic copolymer is crosslinked with melamine formaldehyde and the acrylic copolymer is prepared in a solvent via a skew feed process in which a minimum of 60 percent of an acid functional monomer is concentrated in one feed. The advantage of the copolymer described in U.S. Pat. No. 5,266,361 is that the relationship between solids and viscosity is favorable for the binder. The disadvantages of the copolymer described in U.S. Pat. No. 5,266,361 are many: the requirement that a minimum of 60 percent of the acid functional monomer be concentrated in one feed yields polymers having poor acid etch resistance; the binders are limited to vinyl aromatic contents less than 20 percent because a vinyl aromatic content greater than 20 percent requires a higher acid funtional monomer content to form a stable dispersion, and the higher acid functional monomer content adversely affects the solids-viscosity relationship; and the acid functional monomer is not hydroxyl functional and is therefore not crosslinkable at standard bake temperatures and any attempt to improve crosslinking by the addition of hydroxy functional groups to the acid functional monomer adversely affects the solids-viscosity relationship and results in binders with high viscosities at low solids content.

The hydroxy functional acrylic composition claimed herein has the advantage of maintaining a favorable solids-viscosity relationship and forming stable dispersions while employing low overall acid content (maximum of 60 percent), high vinyl aromatic content (greater than 20 percent), and the addition of hydroxy functional crosslinkable groups by feeding the reaction product of a monoepoxyester and an unsaturated acid functional monomer (minimum of 40%), thereby resulting in improved appearance, humidity resistance, and acid etch resistance.

SUMMARY OF THE INVENTION

This invention is directed to a waterborne coating composition comprising 5–70 weight percent solids of a curing agent and 30–95 weight percent solids of a hydroxy functional acrylic copolymer further comprising 20–70 weight percent of a vinyl aromatic, 0–40 weight percent of a hydroxy functional monomer, 0–70 weight percent of other polymerisable compounds, and 10–80 weight percent of a reaction product of a monoepoxyester and an unsaturated acid functional monomer wherein the copolymer is prepared by a skew feed polymerization process having a plurality of feed streams fed to a reactor and one feed stream contains 5–60 weight percent of the unsaturated acid functional monomer, 40–95 weight percent of the reaction product of a monoepoxyester and an unsaturated acid functional monomer, and 0–55 weight percent of the other polymerisable compounds.

DETAILED DESCRIPTION

The invention claimed herein is a waterborne clearcoat comprising a copolymer having both carboxylic acid groups and hydroxyl groups, said copolymer being made by skewing the feed of a monomer mixture containing both an unsaturated acid finctional monomer and a monoepoxyester, and a curing agent. The hydroxy functionality of the copolymer is provided by the reaction product of an unsaturated acid functional monomer and a monoepoxyester. Skew feed polymerization as used herein means a multi-step reaction wherein products of previous reaction steps are combined with additional reactants in a sequential fashion to yield the desired copolymer. The prefered embodiment of this invention is a two-step skew feed polymerization wherein a first group of monomers are reacted to form an intermediate polymer and a second group of monomers are reacted in the presence of the intermediate polymer to form the copolymer of this invention.

More specficially, the copolymer of this invention is preferably made by first charging a reflux reactor with a monoepoxyester and an organic solvent or solvent blend. The temperature the reactor contents is typically held between 60°–280° C. during polymerization. A first feed stream comprising a mixture of a first quantity of unsaturated acid-functional monomer, a hydroxyfinctional monomer, a vinyl aromatic, an unsaturated monomer, and an initiator is charged to the reactor over a period of time. After addition of the first feed stream, the reactor contents are rinsed with additional organic solvent. A second feed stream comprising a second quantity of the unsaturated acid-functional monomer, additional organic solvent, and additional initiator is charged to the reactor over a period of time. The total amount of unsaturated acid-functional monomer can be varied between the first and second feed streams, but it is essential that one feed stream comprises 5–60 weight percent of the unsaturated acid functional monomer, 40–95 weight percent of the reaction product of a monoepoxyester and an unsaturated acid functional monomer, and 0–55 weight percent of the other polymerisable compounds. Preferably, the copolymer is prepared via skew feed polymerization wherein one feed stream comprises 10–50 weight percent of the unsaturated acid functional monomer and 50–90 weight percent of the reaction product of a monoepoxyester and an unsaturated acid functional monomer. Furthermore, the number and order of feed streams to the reactor can be varried, and in particular the organic solvent and monoepoxyester need not be charged to the reactor vessel but rather can be combined with other feed streams. After addition of the second feed stream, the reactor contents are typically rinsed with additional organic solvent, held for a period of time at reflux, and rinsed a final time with additional organic solvent. The reactor contents are cooled, neutralized with an amine, and inverted by the addition of deionized water. The result is a waterborne dispersion of the copolymer (binder) of this invention. The copolymer typically has a hydroxy value of 30–250) an acid value of 15–50, and a number average molecular weight of 1000–15000, and preferably has a hydroxy value of 60–150, an acid value of 5–35, and a number average molecular weight of 1500–6000.

Vinyl aromatics useful for this invention include styrene, vinyltoluene, and t-butylstyrene, preferably 30–55 weight percent. Acid functional monomers useful for this invention include acrylic acid, methacrylic acid, itaconic acid. Monoepoxyesters useful for this invention include versatic acid glycidylester know by the trademark Cardura E10 and pivalic acid glycidylester known by the trademark Cardura E5, both manufactured by Shell Chemical Company, as well as the reaction product of a tertiary fatty acid up to 12 carbon atoms and epichlorohydrine. Hydroxyfunctional monomers useful for this invention include 2-hydroxyethyl acrylate, hydroxypropyl acrylate, 4-hydroxybutyl acrylate, 2-hydroxyethyl methacrylate, and hydroxypropyl methacrylate.

Other polymerisable compounds useful for this invention include unsaturated monomers such as alkyl cycloalkyl, and aromatic methacrylates and alkyl, cycloalkyl, and aromatic acrylates, including methyl methacrylate, ethyl methacrylate, n-butyl methacrylate, isobutyl methacrylate, t-butyl methacrylate, 2-ethylhexyl methacrylate, isononyl methacrylate, lauryl methacrylate, stearyl methacrylate, cyclohexyl methacrylate, isobornyl methacrylate, phenyl methacrylate, t-butylcyclohexyl methacrylate, 3,3,5-trimethylcyclohexyl methacrylate, benzyl methacrylate, methyl acrylate, ethyl acrylate, n-butyl acrylate, isobutyl acrylate, t-butyl acrylate, 2-ethylhexyl acrylate, isononyl acrylate, lauryl acrylate, stearyl acrylate, cyclohexyl acrylate, isobornyl acrylate, phenyl acrylate, t-butylcyclohexyl acrylate, 3,3,5-trimethylcyclohexyl acrylate, and benzyl acrylate. Additional unsaturated monomers useful for this invention include caprolactone modified hydroxyalkyl acrylate, caprolactone modified hydroxyalkyl methacrylate, acrylamide, methacrylamide, alkoxymethyl acrylamide, alkoxymethyl methacrylamide, acetoacetoxy ethyl methacrylate, methacryloxyethyl phosphate, as well as small amounts of nitrogen containing monomers such as vinyl pyridine, dimethyl aminoethyl acrylate, dimethyl aminoethyl methacrylate, and t-butylamnioethyl methacrylate. Other polymerisable compounds useful for this invention also include di-functional and tri-functional monomers which can be used to increase molecular weight and reactivity of the copolymer, and the total amount of di-functional and tri-functional monomers should not exceed 3–4 weight percent.

Chain transfer agents can be used to control the molecular weight of the copolymer. Preferred chain transfer agents include mercapto derivatives such as 2-mercapto ethanol and t-dodecyl mercaptan The copolymers are prepared in an organic solvent or solvent blend such as alcohols and ether alcohols, including n-butylglycol ether, n-butyldiethyleneglycol ether, isopropanol, n-butanol, i-butanol, propyleneglycol, propyleneglycol methylether. Other solvents such as aliphatics, aromatics, acetates, and ketones can be used. Preferably, the organic solvent is partially or completely soluble in water. After neutralization with an organic amine and inversion using deionized water, excess solvent can be distilled off.

Initiators can be used in the free radical polymerization of the copolymers, including peroxy- and azo- initiators such as 2,2'-azobis(2-methylpropanenitrile) manufactured under the trademark Vazo® 64 by E. I. DuPont de Nemours & Company of Wilmington, Del; 4,4'-azobis(4-cyanopentanoic) acid; and the following initiators made by the AKZO Corp. of Holland and designated by their trademarks in parentheses: di-t-butylperoxide (Trigonox B), t-butylperacetate (Trigonox FC50), t-butylperbenzoate (Trigonox C), and t-butylperpivalate (Trigonox 25 C75).

After polymerization, the copolymer is neutralized with an amine such as 25% ammonia in water, dimethylethanolamine, and dimethylaminomethylpropanol. The amount of amine employed is typically between 40 to 150 percent of the amount of acid groups available, and preferably 70–120 percent on a molar basis. Metal hydroxides such as potassium hydroxide and sodium hydroxide can be used but are not preferred because they may effect humidity performance in the final clearcoat formulations. After neutralization, the copolymer is typically dispersed in deionized water.

The dispersed copolymer is combined with a curing (crosslinking) agent to form a waterborne coating composition. Preferred curing agents include etherified melamines, urea and benzoguanamine formaldehyde, polyisocyanates, blocked polisocyanates such as a caprolactam blocked polyisocyanate, methylethylketoxime blocked isophoronedfisocyanate trimer, hexamethylenediisocyanate trimer and biuret derivatives, and mixtures thereof The waterborne coating composition can comprise from 0–65 weight percent solids of various additives such as thickeners, acrylic emulsions, urethane emulsions, anti-oxidants, UV absorbers, leveling agents, pigments, and extenders. Preferably, the waterborne coating composition comprises 50–80 weight percent solids of the copolymer, 20–40 weight percent solids of the curing agent, and 0–30 weight percent solids of the additives.

EXAMPLES

For each dispersion obtained in the examples described below, the percent solids, pH, viscosity, and acid value were measured. The number and weight average molecular weights were determined using gel permeation chromatography with polystyrene standards. The test results for examples 1–10 are summarized in Table 1. All parts and percentages set forth in the examples are by weight unless designated otherwise.

Example 1—skew feed of the invention

A reaction vessel equipped with a stirrer, reflux condenser, and an addition dropping funnel was charged with a blend of 110 parts n-butylglycol ether and 116.25 parts versatic acid glycidylester (Cardura E10) and was heated to 168° C. reflux. A first feed stream comprising a mixture of 262.5 parts styrene, 195 parts 2-ethylhexylmethacrylate, 112.5 parts 2-hydroxythyl acrylate, 27 parts acrylic acid, 75 parts n-butylglycol ether, and 5 parts di-t-butylperoxide (Trigonox B) was added to the reaction vessel over about 3 hours while maintaining reflux. Ten (10) parts of n-butylglycol ether were added as rinse and the reaction mixture held for 30 minutes at reflux. A second feed stream comprising a mixture of 36.75 parts of acrylic acid, 2 parts di-t-butylperoxide (Trigonox B), and 20 parts n-butylglycol ether were fed over 30 minutes at reflux followed by a rinse with 8 parts n-butylglycol ether. The reaction mixture was held for 30 minutes and followed by the addition of 20 parts n-butylglycol ether. The reaction mixture was cooled to 60 °–70° C. after which 52.2 parts dimethylaminomethylpropanol (80% in deionized water) were added. Further, a dispersion was formed by adding 817 parts of deionized water while vigorously stirring.

Example 2—skew feed of the invention

The procedure of Example I was followed, wherein the 2-ethylhexylmethacrylate of the first feed stream was replaced with n-butyl methacrylate.

Example 3—skew feed of the invention

The procedure of Example 2 was followed, wherein the second feed stream contained all of the acrylic acid.

Example 4—skew feed of the invention

The procedure of Example 1 was followed using 28.5 parts acrylic acid and 27 parts styrene in the first feed stream and 27.95 parts acrylic acid in the second feed stream. 45.7 parts dimethylaminomethylpropanol (80% in deionized water) were added to neutralize and additional deionized water was added to dilute the dispersion down to about 36% solids.

Example 5—skew feed of the invention

The procedure of Example 4 was followed using 11.25 parts acrylic acid in the first feed stream and 45 parts acrylic acid in the second feed stream.

Comparative Example 6—skew feed according to U.S. Pat. No. 5,266,361

The procedure of Example 1 above was followed using 270 parts styrene and 33.75 parts acrylic acid in the first feed stream and 22.5 parts of acrylic acid in the second feed stream. 45.7 parts dimethylaminomethylpropanol (80% in deionized water) were added to neutralize and additional deionized water was added to dilute the dispersion down to about 36% solids.

Comparative Example 7—mono-feed

The procedure of Example I was followed except that a single feed stream containing the styrene, 2-ethylhexylmethacrylate, 2-hydroxy ethyl acrylate, acrylic acid, 5 parts di-t-butylperoxide (Trigonox B), and 95 parts n-butylglycol was fed to the reactor over a period of three hours in place of the dual feed streams used in Example 1. The reaction mixture was rinsed with 20 parts n-butylglycol and held for a minute followed by thinning with 20 parts n-butylglycol. 58 parts dimethylaminomethylpropanol (80% in deionized water) were added to neutralize and additional deionized water was added to dilute the dispersion down to about 36% solids.

Comparative Example 8—mono-feed with more versatic acid glycidylester

The procedure of Comparative Example 7 was followed using 120 parts 2- ethylhexylmethacrylate, 80.25 parts acrylic acid, and 174.75 parts versatic acid glycidylester.

Comparative Example 9—mono-feed without versatic acid glycidylester at the same hydroxyl value as Comparative Example 8

The procedure of Comparative Example 7 was followed eliminating the versatic acid glycidylester in the reactor and using 262.5 parts styrene, 157.5 parts 2-ethylhexylmethacrylate, 86.25 parts 2-ethylhexylacrylate, 112.5 parts 2-hydroxyethylacrylate, 101.25 parts hydroxypropylmethacrylate, and 30 parts acrylic acid.

Example 10—skew feed of the invention

A reactor equipped as explained in Example 1 was charged with 90 parts n-butylglycol ether, 20 parts n-butyldiethyleneglycol ether, and 174.75 parts versatic acid glycidylester and heated to reflux. A first feed stream comprising a mixture of 262.5 parts styrene, 75 parts 2-ethylhexylmethacrylate, 157.5 parts 2-hydroxyethylacrylate, 43.50 parts acrylic acid, 5 parts di-t-butylperoxide (Trigonox B), and 65 parts n-butylglycol ether was fed to the reactor over a 3 hour period followed by a rinse with 20 parts n-butylglycol ether. The reactor contents were held at reflux for 30 minutes. A second feed steam comprising a mixture of 36.75 parts. acrylic acid, 2 parts di-t-butylperoxide (Trigonox B), and 20 parts n-butyldiethyleneglycol ether was fed over a 30 minute period followed by a rinse with 8 parts n-butylglycol ether. The reactor contents were held at reflux for 1 hour and further diluted with 20 parts of n-butylglycol ether. The mixture was cooled to 60°–70° C. and 52.2 parts of dimethylaminomethylpropanol were added. Further, a dispersion was formed by adding 817 parts of deionized water while vigorously stirring.

Clearcoat formulations

Seven clearcoat paint compositions were prepared according to the formulations set forth in Table 2. These clearcoats were sprayed over a typical automotive basecoat at a film build of 50 microns. The panels were baked for 30 minutes at 120° C. Acid etch resistance of the clearcoat was tested by placing a 36% sulfuric acid solution at various locations on the panels and placing the panels in a gradient oven. The temperature at which a first visible spot was seen on the clearcoat was recorded. The clearcoat gloss was measured at a 20° angle using a glossmeter. The test results are summarized in Table 3. All of the clearcoat formulations developed sufficient solvent resistance, hardness, and mechanical properties (flexibility, chipping resistance) needed for a typical automotive clearcoat formulation. However, the clearcoats prepared using the binders of this invention, i.e., clearcoats 1, 2, & 3, have superior acid etch performance and gloss readings when compared to the clearcoats prepared using the binders of the comparative examples, i.e., clearcoats 4, 5, 6, & 7.

TABLE 1

SUMMARY OF TEST RESULTS FOR EXAMPLES 1–10

| EXAMPLE | SOLIDS | VISCOSITY | PH | MN | MW | ACID VALUE |
|---|---|---|---|---|---|---|
| 1* | 42.8% | 120,000 cps | 9.1 | 3,800 | 1,200 | 28.9 |
| 2* | 42.2% | 215,000 cps | 8.1 | 3,900 | 12,800 | 29.4 |
| 3* | 42.7% | 94,000 cps | 7.8 | 3,600 | 13,200 | 28 |
| 4* | 35.3% | 1,250 cps | 9.3 | 3,500 | 12,000 | 20.6 |
| 5* | 35.1% | 4,100 cps | 9.4 | 3,600 | 13,000 | 20.6 |
| 6** | 36.8% | 3,500 cps | 9.9 | 4,000 | 15,200 | 21.1 |
| 7*** | 36% | 39,000 cps | 9 | 3,900 | 15,800 | 26.6 |
| 8*** | 35.3% | 120,000 cps | 9.5 | 1,400 | 22,120 | 26.4 |
| 9*** | 36.6% | Too high to measure | 8.6 | 1,700 | 22,900 | 29 |
| 10* | 40% | 89,800 cps | 8.8 | 4,000 | 16,100 | 25.2 |

*skew feed according to this invention
**skew feed according to U.S. Pat. No. 5,266,361
***mono-feed

TABLE 2

CLEARCOAT FORMULATIONS AT A CONSTANT ACRYLIC BINDER/MELAMINE FORMALDEHYDE CROSSLINKER RATIO

| CLEARCOAT FORMULATION | 1 | 2 | 3 | 4 | 5 | 6 | 7 |
|---|---|---|---|---|---|---|---|
| Binder Ex. 1* | 75 | | | | | | |
| Binder Ex. 2* | | 75 | | | | | |
| Binder Ex. 3* | | | 75 | | | | |
| Binder Comparative Ex. 6** | | | | 75 | | | |
| Binder Comparative Ex. 7*** | | | | | 75 | | |
| Binder Comparative Ex. 8*** | | | | | | 75 | |
| Binder Comparative Ex. 9*** | | | | | | | 75 |
| Butylated Melamine - Formaldehyde crosslinker (Luwipal 8735 - BASF) | 16.15 | 16.15 | 16.75 | 14.06 | 14.06 | 14.06 | 14.06 |
| Byk 346 - Mallinkrodt | 0.6 | 0.6 | 0.6 | 0.6 | 0.6 | 0.6 | 0.6 |
| Surfynol 104H-Air Products | 0.5 | 0.5 | 0.5 | 0.5 | 0.5 | 0.5 | 0.5 |
| BGL | 3 | 3 | 3 | 3 | 3 | 3 | 3 |
| DI | 4.75 | 4.75 | 4.75 | 6.84 | 6.84 | 6.84 | 6.84 |

*skew feed according to this invention
**skew feed according to U.S. Pat. No. 5,266,361
***mono-feed

TABLE 3

GLOSS AND ACID ETCH RESISTANCE OF CLEARCOAT FORMULATIONS OF TABLE 2

| | Gloss (20° angle) | Acid etch resistance (° C) |
|---|---|---|
| clearcoat 1* | 93.8 | 78 |
| clearcoat 2* | 94.6 | 76 |
| clearcoat 3* | 94.4 | 76 |
| clearcoat 4** | 90.1 | 49 |
| clearcoat 5*** | 81.2 | 60 |
| clearcoat 6*** | 89 | 55 |
| clearcoat 7*** | 92 | 49 |

*skew feed according to this invention
**skew feed according to US 5,266,361
***mono-feed

What is claimed is:

1. A waterborne coating composition comprising:
   a) 30–95 weight percent solids of a copolymer, comprising,
      i) 20–70 weight percent of a vinyl aromatic,
      ii) 10–80 weight percent of a reaction product of a monoepoxyester and an unsaturated acid functional monomer,
      iii) 0–40 weight percent of a hydroxy functional monomer, and
      iv) 0–70 weight percent of other polymerisable compounds, wherein the copolymer is prepared by a skew feed polymerization process having a plurality of feed streams charged to a reactor and one feed stream comprises,
         1) 5–60 weight percent of the unsaturated acid functional monomer,
         2) 40–95 weight percent of the reaction product of a monoepoxyester and an unsaturated acid functional monomer, and
         3) 0–55 weight percent of the other polymerisable compounds; and the remaining feed streams comprise the balance of components i–iv; and
   b) 5–70 weight percent solids of a curing agent.

2. The waterborne coating composition of claim 1 wherein said copolymer has a hydroxyl value of 30–250, an acid value of 15–50, and a number average molecular weight of 1000–15000.

3. The waterborne coating composition of claim 1 wherein said monoepoxyester is selected from the group consisting of versatic acid glycidylester, pivalic acid glycidylester, the reaction product of a tertiary fatty acid up to 12 carbon atoms and epichlorohydrin, and mixtures thereof.

4. The waterborne coating composition of claim 1 wherein said unsaturated acid functional monomer is selected from the group consisting of acrylic acid, methacrylic acid, itaconic acid, and mixtures thereof.

5. The waterborne coating composition of claim 1 wherein said vinyl aromatic is selected from the group consisting of styrene, vinyltoluene, t-butylstyrene, and mixtures thereof.

6. The waterborne coating composition of claim 5 wherein said vinyl aromatic comprises 30–55 weight percent of the copolymer.

7. The waterborne coating composition of claim 1 wherein said hydroxy functional monomer is selected from the group consisting of 2-hydroxyethyl acrylate, hydroxypropyl acrylate, 4-hydroxybutyl acrylate, 2-hydroxyethyl methacrylate, hydroxypropyl methacrylate, and mixtures thereof.

8. The waterborne coating composition of claim 1 wherein said other polymersiable compounds are selected from the group consisting of alkyl methacrylates, cycloalkyl methacrylates, aromatic methacrylates, alkyl acrylates, cycloalkyl acrylates, aromatic acrylates, and mixtures thereof.

9. The waterborne coating composition of claim 1 wherein said curing agent is selected from the group consisting of etherified melamines, urea and benzoguanamine formaldehyde adducts, alkoxylated melamine formaldehyde adducts, polyisocyanates, blocked polyisocyanates, and mixtures thereof.

10. The waterborne coating composition of claim 1 further comprising 0–65 weight percent solids of at least one additive selected from the group consisting of thickeners, acrylic emulsions, urethane emulsions, anti-oxidants, UV absorbers, leveling agents, pigments, extenders, and mixtures thereof.

11. The waterborne coating composition of claim 1 wherein said one feed stream comprises 10–50 weight percent of the unsaturated acid functional monomer and 50–90 weight percent of the reaction product of a monoepoxyester and an unsaturated acid functional monomer.

* * * * *